C. E. PEIRCE.
Potato and Peanut Diggers.

No. 136,860.　　　　　　　　　　　Patented March 18, 1873.

UNITED STATES PATENT OFFICE.

CYRUS E. PEIRCE, OF CENTREVILLE, MICHIGAN.

IMPROVEMENT IN POTATO AND PEA-NUT DIGGERS.

Specification forming part of Letters Patent No. 136,860, dated March 18, 1873.

*To all whom it may concern:*

Be it known that I, CYRUS E. PEIRCE, of Centreville, in the county of St. Joseph and State of Michigan, have invented a new and useful Improvement in Potato and Pea-Nut Digger; and I do declare that the following is a true and accurate description thereof, reference being had to the accompanying drawing and to the letters of reference marked thereon and being a part of this specification, in which—

Figure 1:
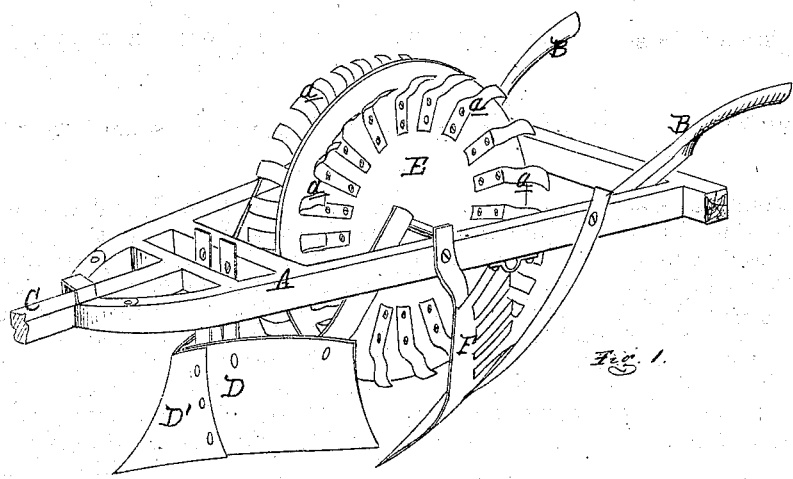
Figure 2:
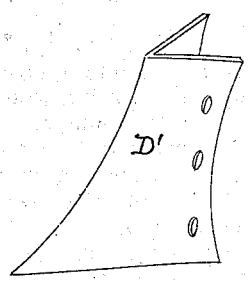
Figure 3:
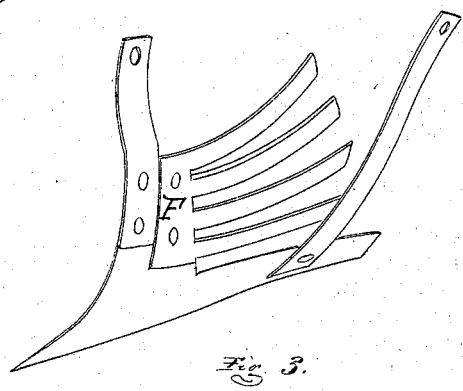

Figure 1 is a perspective view of my improved implement. Fig. 2 is detached and enlarged view of the plow-point. Fig. 3 is a detached and enlarged view of the side shovels.

Like letters refer to like parts in each figure.

The nature of this invention relates to the construction of a potato and pea-nut digger, the parts of which are so arranged that a double-shovel plow parts the hill; a wheel of peculiar construction follows, sifting the potatoes or pea-nuts, and discharging them behind the side plows, which fill up the furrow made by the plow, leaving the potatoes or pea-nuts on top. The invention consists in the peculiar construction and arrangement of the various parts, as more fully hereinafter described.

In the accompanying drawing, A represents a suitable frame; B, the guiding-handles; and C, the point where the team is secured. D is a double mold-board plow, the point D' of which is made solid, and the mold-boards or wings are secured thereto by means of rivets or bolts. This plow is attached under the frame by suitable hangers or standards. E is a wheel rigidly secured to an axle, which is suitably journaled to the sides of the frame, so that the wheel will track in the center of the furrow opened by the plow D. Upon each side of this wheel are riveted or otherwise secured a series of curved fingers, $a$, projecting outwardly, and their outer ends terminating on a line with the periphery of the wheel. F are side shovels or plows secured under the frame, and are generally of the form shown in the drawing.

The plow is designed to split the hill and throw half of the same in opposite directions. The fingers of the rotating wheel sift out the contents of the hill on each side of the wheel, and the side shovels throw the earth back into the furrow, while the fingers throw the contents of the hill to the rear, leaving them on the top of the ground.

What I claim as my invention, and desire to secure by Letters Patent, is—

The combination of the finger-plates F with the frame A, opening-plow D D', and wheel E, as set forth.

CYRUS E. PEIRCE.

Witnesses:
 SAMUEL W. PLATT,
 WM. ENNIS.